Patented Nov. 11, 1930

1,781,154

UNITED STATES PATENT OFFICE

HUGH E. ALLEN, OF CHICAGO, ILLINOIS, ASSIGNOR OF ONE-HALF TO ALBERT G. McCALEB, OF EVANSTON, ILLINOIS

CONDIMENTATION OF GROUND MEATS

No Drawing.   Application filed July 27, 1929. Serial No. 381,680.

My invention relates to the condimentation of ground meats from which are made sausage, Frankfurters, Bologna, meatloaves, and the like, and the principal objects of my invention are to provide a novel seasoning material, devoid of spice or pepper fibers, which may be applied in a dry state to the meats before grinding to become thoroughly admixed with and absorbed by the meats during the meat-grinding operation; which yields its flavors and aromas to the meats much more readily and completely than do any of the seasoning materials heretofore used; which does not speckle or otherwise detract from the appearance of the meats to which it is applied; which may be kept for long periods of time without deterioration and be at all times ready for use; which may be manufactured economically and be marketed in containers which will handle dry but not liquid materials.

Formerly it had been the practice from time immemorial, in the seasoning of ground meats, to mix ground fibers of suitable spices and peppers together in the requisite or desired proportions and then add this mixture to the meats before or during the meat-grinding operation. This practice is not now commonly employed in the commercial making of ground meat products, because the spice and pepper fibers speckled the meats and thus detracted from their appearance, because such fibers did not yield their flavors and aromas readily to the meats, and because it was not possible uniformly to distribute such a seasoning throughout the meats. More recently it has been the commercial practice to season ground meats with a so-called "liquid seasoning" consisting of oleo-resins of peppers and the essential oils of spices and/or distilled spice essences, whipped into an emulsion with suitable vegetable gums and water. Such "liquid seasonings" have not been very satisfactory because it is not possible to apply same to the meats before the meat-grinding operation,—their introduction into the meats necessitating a special mixing operation following the grinding operation,—because such "liquid seasonings" quickly deteriorate because of the unstability of the emulsion and for other reasons, and because the minute globules of essential oils and oleo-resins in the emulsion are invariably and unavoidably covered by thin films of vegetable gum, which tend to maintain the integrity of such globules and hence to prevent them from imparting all of their flavors and aromas to the ground meats to which the emulsion is applied.

In preparing the improved seasoning material of my invention I prefer to add approximately 3 per cent (3%) (by weight) of the essential oils and/or distilled essences of spices and oleo-resins of peppers, of the preferred varieties, and in the desired proportions, to approximately ninety-seven percent (97%) of coarse granulated sugar (preferably sucrose), this mixture being placed in a grinding mill and there operated upon until the initially coarse granulated sugar has been reduced to a semi-pulverulent state, that is to say to a degree of fineness greater than that of any of the common commercial forms of granulated sugar but preferably not to that degree of fineness which characterizes the common commercial forms of pulverized sugar.

When this has been accomplished the spice oils and/or essences and oleo-resins are thoroughly distributed through and absorbed by the sugar,—the result being: a seasoning material which may be applied to meat chunks and trimmings before grinding; a dry seasoning material which contains no spice or pepper fibers to speckle or otherwise detract from the appearance of the meats with and into which it is ground; a seasoning material which in its entirety is meat-soluble; a seasoning material wherein the globules of essential oils and/or essences and oleo-resins are not only devoid of any gum film to reduce their efficacy, but one in which the minute globules of essential oils and oleo-resins are associated with a sugar carrier which, by its dissolving in the meats, permits the essential oils and/or essences and oleo-resins most effectively and uniformly to yield their flavors and aromas to the meats with and into which the seasoning material is ground.

In practice from one-half (½) to one (1)

pound of my improved seasoning material is added to approximately one hundred (100) pounds of meat which is to be ground into sausage, meat-loaves or the like. In these proportions the sugar is imperceptible to the taste, as sugar, but does function to restore the palatability of any reasonably small portions of old off-taste meat which may form part of the bulk of meats to which the seasoning is applied.

An improved characteristic of the seasoning material of my invention is that the essential oils and oleo-resins for all practical purposes remain permanently evenly distributed throughout the sugar. This is due to the fact that the sugar is in very finely divided form (preferably semi-pulverulent), and is also due to the fact that the sugar is reduced from its initially coarse state to its ultimate finer state in the presence of the essential oils and oleo-resins. By grinding the sugar in the presence of the essential oils and oleo-resins I apparently get the advantages of that highly abstruse phenomenon known to colloid chemists as "adsorption."

The simplest and best known example of "adsorption" is the decolorization of liquids by treating the same with boneblack or powdered charcoal. In this operation the molecules of the coloring matter become trapped or absorbed at the surfaces of the particles of boneblack or powdered charcoal, so that the coloring matter can be removed simply by filtering off the boneblack or charcoal particles.

In the seasoning material of my invention I realize the advantages of a phenomenon which is either adsorption or something closely akin thereto. The minute particles of the essential oils and oleo-resins undoubtedly are effectively trapped or absorbed by the sugar particles, so there is no appreciable tendency for the essential oils and oleo-resins to settle down in the sugar. I find that, even after the seasoning material of my invention has stood undisturbed in a container for a long period of time, it is impossible to discover any greater proportion of essential oils and oleo-resins in that sugar which lies at the lowermost part of the container than is found in the sugar at the very top of the container. As I understand the phenomenon under discussion, there is no chemical interaction between the finely divided sugar particles and the finely divided particles of essential oils and oleo-resins, but there is rather a very firm physical union which is broken up only when the sugar goes into solution with the meats.

Another advantage of the seasoning material of my invention is that it is practically non-hygroscopic, i. e., the flavoring material has no greater moisture attracting tendency than has sugar alone.

The terms "spice oils" and "essential oils of spices" as used in the appended claims include the so-called "essences of spices."

Having thus described the nature of my improved seasoning material and the preferred method whereby to produce the same, what I claim as new and desire to secure by United States Letters Patent is:

1. A dry seasoning material for ground-meats comprising a minor quantity of the essential oils of spices and oleo-resins of peppers, and a major quantity of semi-pulverulent sugar intimately mixed with said oils and oleo-resins and acting as a carrier therefor.

2. The method of making a material for seasoning ground meats which consists in mixing a minor quantity of spice oils with a major quantity of initially coarse granulated sugar and grinding the mixture until the sugar has been reduced to a semi-pulverulent state.

3. The method of making a material for seasoning ground meats which consists in mixing a minor quantity of spice oils and oleo-resins of peppers with a major quantity of initially coarse granulated sugar and grinding the mixture until the sugar has been reduced to a semi-pulverulent state.

4. The method of making a material for seasoning ground meats which consists in mixing a minor quantity of oleo-resins with a major quantity of initially coarse granulated sugar and grinding the mixture until the sugar has been reduced to a semi-pulverulent state.

5. The method of making a substantially dry seasoning for ground meats which consists in introducing a minor quantity of spice oils and oleo-resins of peppers into a major quantity of sugar and simultaneously reducing the sugar to semi-pulverulent form to establish firm physical union between the sugar particles of the spice oils and oleo-resins.

6. A substantially dry material for seasoning meats during the grinding of the latter comprising a minor quantity of spice oils and oleo-resins ground into intimate relationship and thorough admixture with a sugar carrier.

7. A dry material for seasoning ground meats consisting of finely divided sugar, spice oils and oleo resins of peppers, the spice oils and oleo resins of peppers being in the form of minute particles evenly distributed throughout the sugar and having with the particles of the sugar a firm physical union which is broken only when the sugar is absorbed by the meats to which the seasoning material is applied.

8. A dry substantially non-hygroscopic material for seasoning ground meats consisting of a major quantity of sugar ground into firm physical union with minute particles of a minor quantity of spice oils and oleo resins of peppers evenly distributed throughout the sugar.

9. A substantially dry and non-hygroscopic material for seasoning ground meats consisting of a major quantity of finely divided sugar having firm physical union with minute particles of a minor quantity of spice oils and oleo resins of peppers evenly distributed throughout the sugar.

In witness whereof, I hereunto subscribe my name this 25th day of July, 1929.

HUGH E. ALLEN.